T. F. CALDWELL.
QUICK FIRING MACHINE GUN.
APPLICATION FILED AUG. 21, 1913.
1,090,124.  Patented Mar. 10, 1914.
5 SHEETS—SHEET 1.
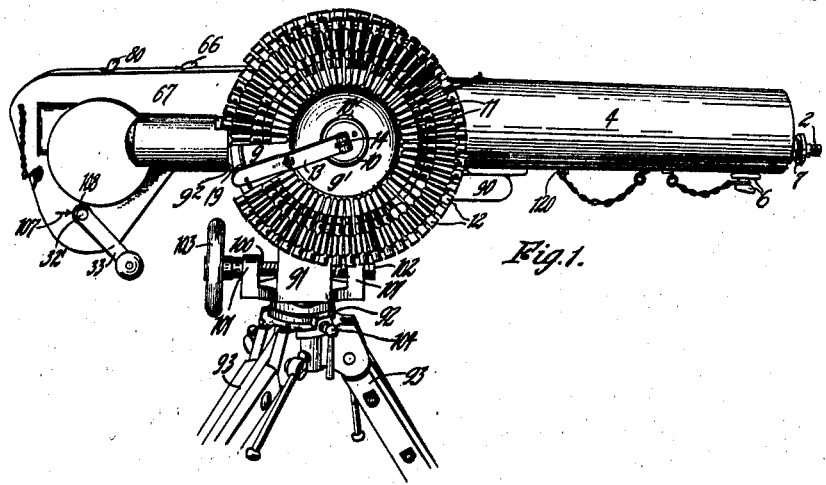
Fig. 1.
Fig. 2.
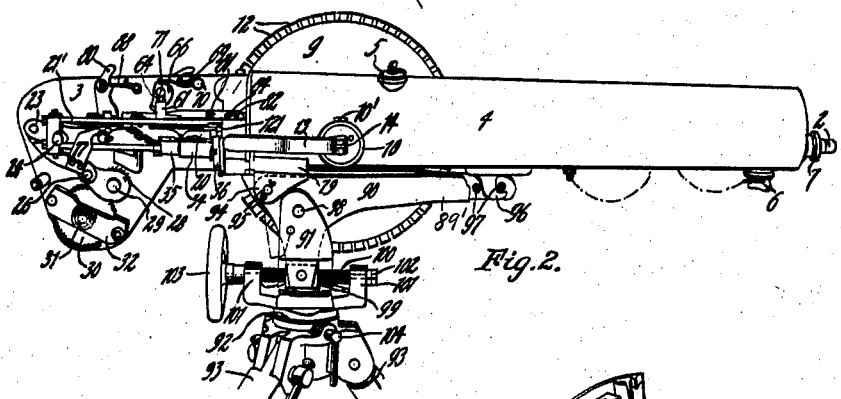
Fig. 3.

T. F. CALDWELL.
QUICK FIRING MACHINE GUN.
APPLICATION FILED AUG. 21, 1913.
1,090,124.
Patented Mar. 10, 1914.
5 SHEETS—SHEET 2.
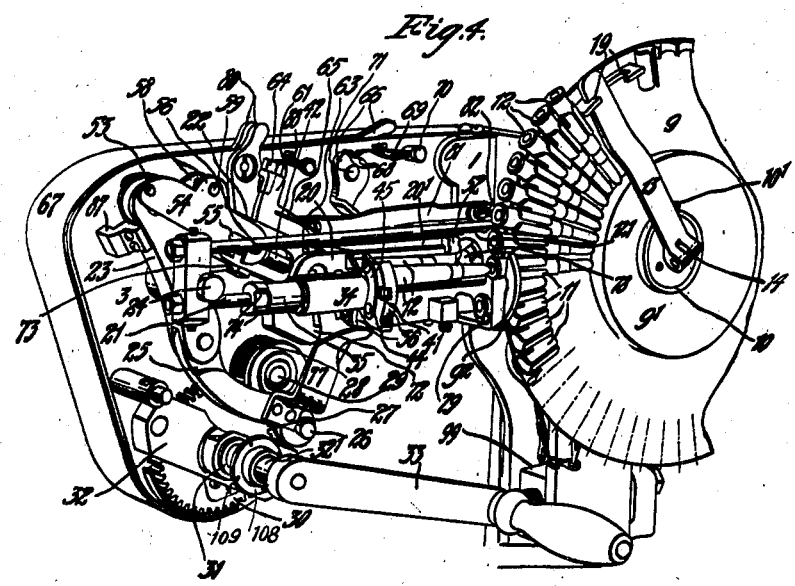
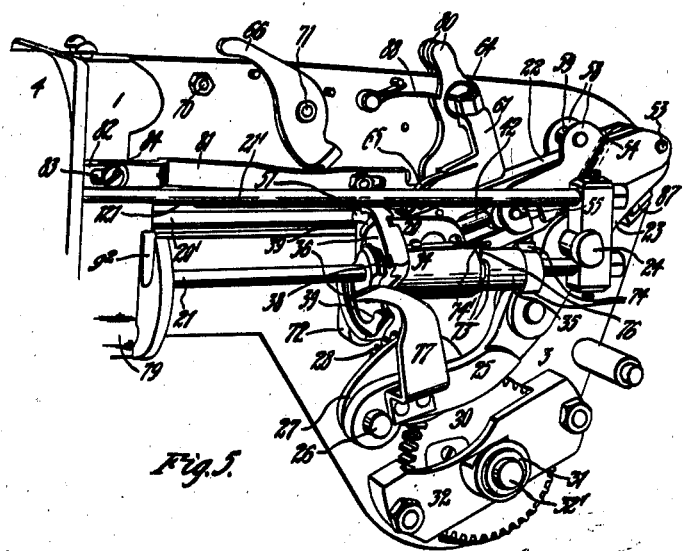

T. F. CALDWELL.
QUICK FIRING MACHINE GUN.
APPLICATION FILED AUG. 21, 1913.
1,090,124.
Patented Mar. 10, 1914.
5 SHEETS—SHEET 3.
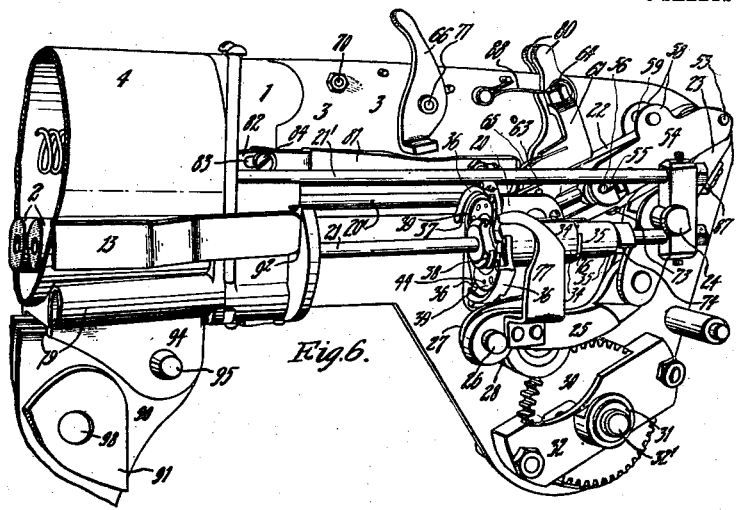
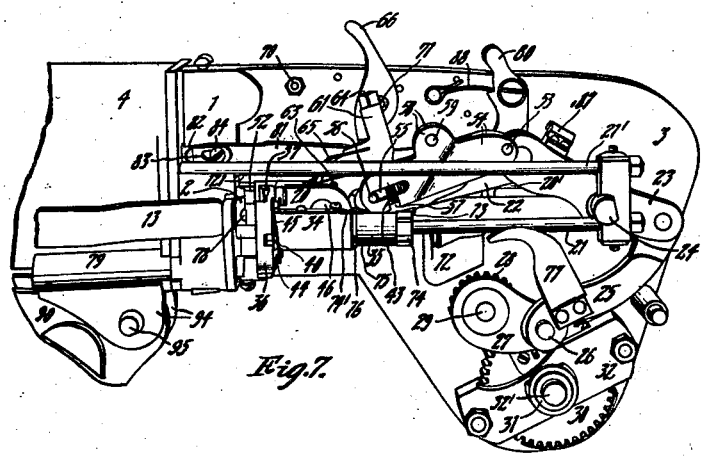

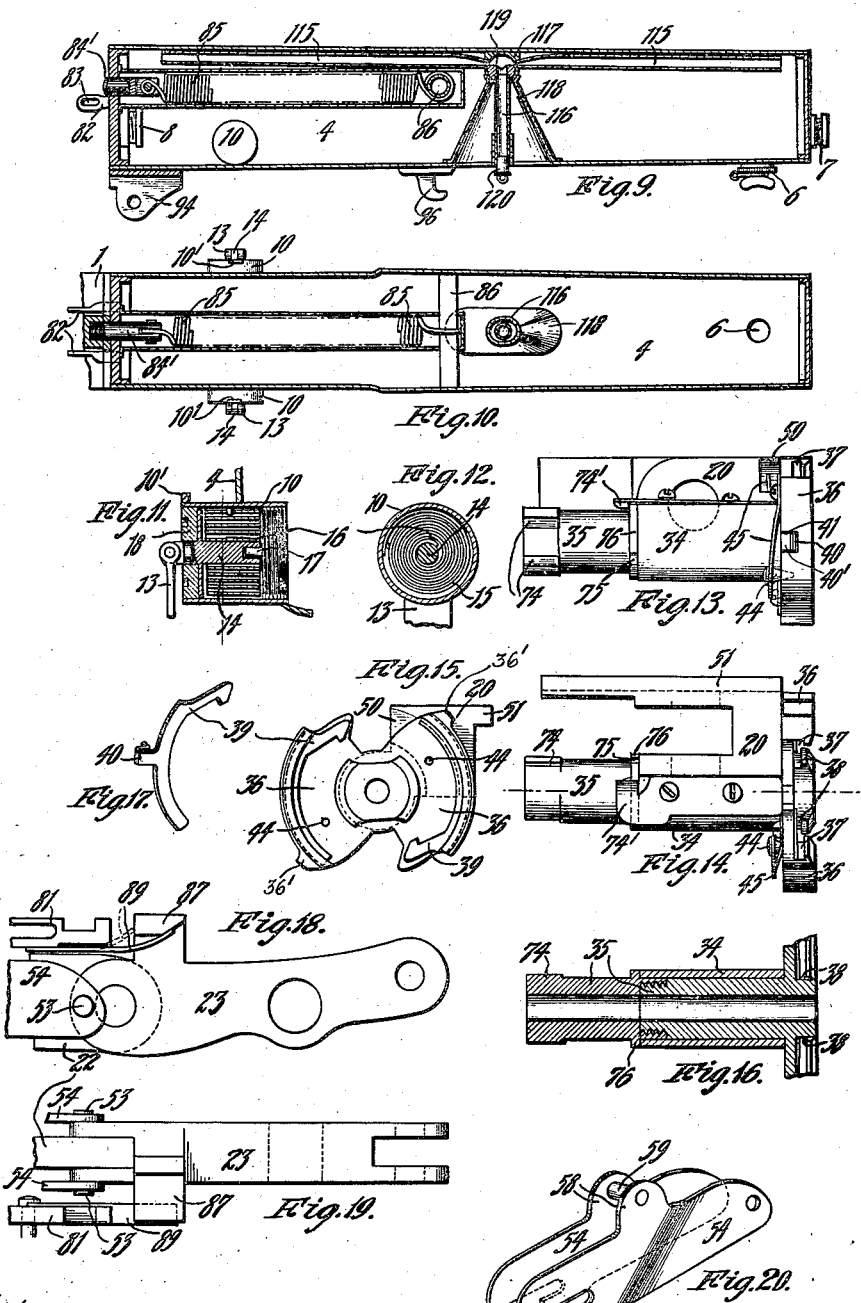

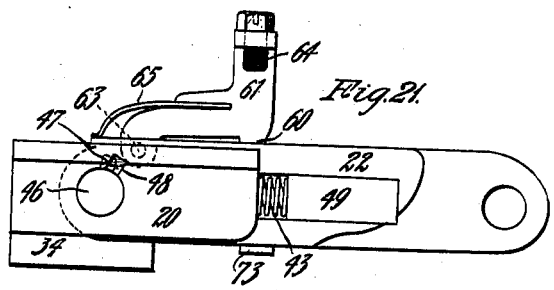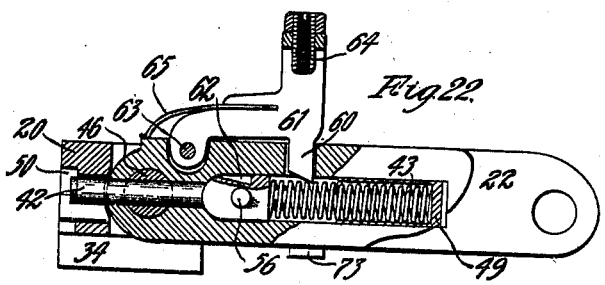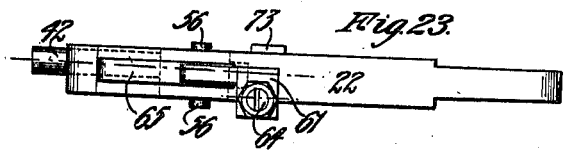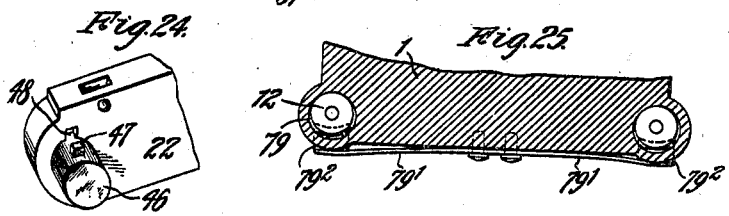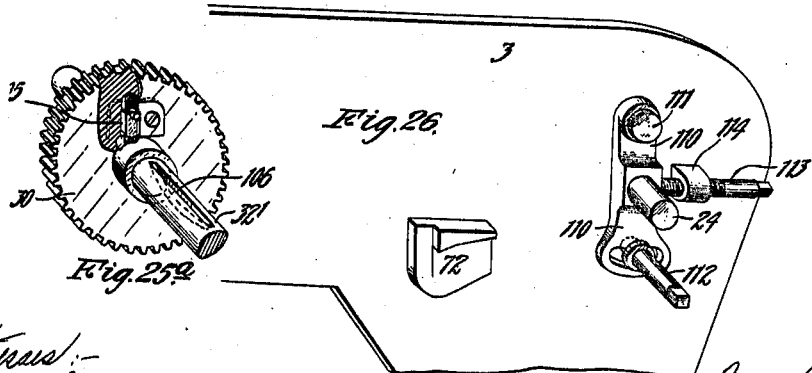

UNITED STATES PATENT OFFICE.

THOMAS FREDERICK CALDWELL, OF RICHMOND, VICTORIA, AUSTRALIA.

QUICK-FIRING MACHINE-GUN.

1,090,124.      Specification of Letters Patent.     Patented Mar. 10, 1914.

Application filed August 21, 1913. Serial No. 786,036.

*To all whom it may concern:*

Be it known that I, THOMAS FREDERICK CALDWELL, of 6 Church street, Richmond, in the State of Victoria, Commonwealth of Australia, a subject of the King of Great Britain, have invented certain new and useful Improvements in Quick-Firing Machine-Guns, of which the following is a specification.

The object of this invention is to provide an improved quick-firing machine gun, which will be exceedingly light, simple and durable in construction, and perfectly easy to operate, with varying degrees of rapidity to suit any particular requirements or emergencies.

Moreover, a machine gun constructed according to the invention will consist of comparatively few parts, the more essential of which can be readily adjusted to compensate for general wear, and may be renewed with very little trouble. Furthermore, every part of the mechanism is practically self-cleaning, and, therefore, will not be injured nor caused to jam should the gun be operated during a sand-storm or be subjected to similar unfavorable conditions.

One of the salient features of the present invention is its reliability in operation, every provision having been made to counteract the stresses incident to the type of weapon to which it relates, and to provide means for effecting a free working of all its parts.

The invention, briefly, consists of a body, which is provided with two forwardly projecting barrels of like construction. The barrels are of ordinary machine gun pattern, and may be jacketed and provided with means for effecting a continuous circulation of a cooling medium thereand. The breech ends of the barrels screw into blocks formed on the front end of a stout body, upon both sides of which are situated independent mechanisms for feeding and firing cartridges and for extracting and ejecting the cartridge cases. The operating mechanisms on both sides of the body are identical, and can be made to operate alternately or simultaneously to fire the cartridges from one or both barrels, respectively. The operative parts of the mechanisms can be very strongly constructed, and can be taken apart easily, and put together without the aid of special tools. The gun frame can be mounted on a tripod or in any other approved way, and the elevation and depression of the barrels can be adjusted by means of a screw operated by a hand wheel or other suitable contrivance.

In order that the invention may be readily understood, reference will now be had to the accompanying sheets of explanatory drawings, wherein—

Figure 1 is a view in perspective of the improved machine gun. Fig. 2 is a view similar to Fig. 1, showing part of the cover and one magazine removed to show part of the mechanism. Fig. 3 is a view in perspective of the mechanism on one side of the gun, showing the breech action closed and a partly emptied magazine in position. Fig. 4 is a view similar to Fig. 3, and shows the breech action partly open. Fig. 5 illustrates in perspective the operative parts of the gun, with the breech mechanism open, and viewed from the opposite side to that shown in Figs. 3 and 4. Fig. 6 is a view similar to Fig. 5, showing the breech mechanism at the commencement of its closing movement. Fig. 7 is a view in perspective, showing the breech mechanism nearly closed. Fig. 8 is a view in plan of both breech mechanisms, one side being open and the other closed. Figs. 9 to 26 illustrate various constructional details of the invention hereinafter described.

In these drawings like characters of reference have been employed to indicate similar parts in the different views, and the numeral (1) designates the gun body, to the front of which is screwed a pair of barrels (2) of machine gun pattern. Extending rearwardly from the body (1), and formed integrally therewith, is a vertical plate (3), on both sides of which are mounted breech mechanisms of similar construction for feeding cartridges from the magazines to, and extracting shells from, the barrels.

The barrels (2) can be provided with a water-jacket (4), having an opening covered by a screw-cap (5) for permitting water or other cooling medium to be supplied thereto, and an outlet covered by a screw-cap (6), or the like for permitting the said jacket to be drained. The barrels (2) can be arranged to reciprocate in glands (7) and (8), at the front and rear ends respectively of the water-jacket.

A circular magazine (9) is revolubly mounted on laterally-projecting bosses (10) formed on each side of the water-jacket. When a water-jacket is not used the bosses (10) can be supported by brackets or the like fitted to the mounting of the gun or in any other approved way. A stud (10¹) is formed on the outer ends of the bosses (10) to keep the magazines in position thereon, or the said magazines can be retained in position by other suitable means.

The magazines are provided with a plurality of radially-disposed spring clips (11), which are adapted to hold cartridges (12), with their rims projecting outwardly as shown. The center of the outer face of the magazine is formed with a concentrically-disposed collar or raised portion (9¹), against which the points of the bullets of the cartridges are arranged to abut, and so determine their correct positions in the clips (11). The cartridges are thrust into the clips (11), and when the points of the bullets abut against the raised portion (9¹), the bases of the cartridges project somewhat beyond the edge of the magazine. The magazines are rotated by means of arms (13), which are connected, hingedly, at their inner ends to spindles (14) passing centrally through the bosses (10). The said spindles are acted upon by clock springs (15), having one of their ends engaging studs (16) on the spindles, and their other ends affixed to the inner peripheries of the bosses (10). The inner ends of the spindles are adapted to bear on center pins (17), while their outer ends are mounted in holes formed centrally in plugs or nuts (18) screwed into the outer ends of the bosses.

The charged magazines (9) are placed on their respective bosses (10), and the arms (13) are rotated to place an approved tension on the springs (15), after which the outer ends of the said arms are placed in engagement with jaws (19) formed on the outer faces of the magazines. The pressure of the arms in the jaws (19) causes the magazines to be rotated until that portion of the first cartridge extending beyond the edges of the magazines rests in jaws (9²) projecting laterally from the sides of the body. As the cartridges are withdrawn from the clips (11) by the breech mechanisms, the magazines are rotated intermittently by the pressure of the springs (15) on the arms (13) to place the next cartridges in the jaws (9²).

The breech mechanisms comprise sliding blocks (20), which are adapted to move freely in guide-ways (20¹), and on guide rods (21) to and from the barrels and parallel therewith. If preferred, the guide rods (21) can be dispensed with and the guide ways (20¹) can be made larger and be shaped to hold the blocks (20) quite firmly at any point in their travel. The said blocks (20) are connected by links (22) to the inner ends of rocking levers (23), mounted on studs (24) projecting laterally from the rear end of the vertical plate (3).

The outer ends of the rocking levers (23) are connected by links (25) to studs (26) formed eccentrically on arms (27) disposed radially on pinions (28) mounted on studs (29) on the vertical plate (3). The teeth of the pinions (28) mesh with the teeth of wheels (30) of larger diameter, which are secured to opposite sides of a depending portion of the rear end of the vertical plate (3) in an approved way.

The wheels (30) are furnished with laterally projecting collars (31), which find bearings in brackets (32) fitted to said plate (3). A spindle (32¹) passes transversely through the wheels (30) and plate (3), and is provided on one end with a cranked operating handle (33) of preferred construction.

The breech blocks (20) are formed with longitudinally disposed bosses or sleeves (34) having their center lines disposed centrally between the center lines of the barrels and those of the cartridges in the magazines. The guide rods (21) pass centrally through the bosses or sleeves (34), and fitting revolubly within said sleeves and on the rods are bolts (35) having enlarged front ends formed into oppositely disposed segmental shaped and concentrically disposed gripping members (36). The adjacent concentric faces of the gripping members (36) on each bolt (35) are formed with undercut recesses (37) and (38) for engaging the rims of the cartridges. Each segmental shaped gripping member (36) is provided with a curved flat spring (39), which is formed and disposed in such a way as to insure a good frictional grip being maintained on the rim of a cartridge. The said springs (39) are formed with projecting portions (40), which can be passed through holes (41) in the sides of the gripping members and bent over or fitted with angularly shaped pieces (40¹) to retain the springs in position. The breech block and the gripping members are reciprocated sufficiently to load cartridges into the barrels and to eject the empty shells therefrom.

The links (22) connecting the rocking levers (23) to the breech blocks (20) are bored longitudinally at their front ends and mortised transversely at their center to receive striking hammers (42) and helical compression springs (43) for operating the same. The hammers (42) pass through the forward end of the said links and breech blocks (20), and are adapted to strike firing pins (44), one of which is fitted to the rear of each of the segmental shaped gripping members (36). The said firing pins (44) are carried on the ends of curved springs (45) of flat metal which tend to keep the said pins normally away from the caps of the cartridges engaged by the gripping members. The striking hammers pass through pins (46) connecting the links (22) to the breech blocks (20), and the said pins are prevented from rotating relatively to the links by the formation thereon of projections (47) to fit snugly into recesses (48) formed in the sides of the links. The rear ends of the springs (43) may be increased in hollow blocks (49), which permit of the said springs being easily and quickly removed and replaced, when desired. The holes in the front of the breech blocks (20), through which the striking pins (42) pass, are slightly elongated to provide for perfect freedom of movement of said pins when the links (22) are operated.

The front faces of the breech blocks (20) are formed with semi-circularly shaped grooves (50) to permit of the firing pins (44) and springs (45) moving freely thereacross. The breech blocks (20) are furnished with projecting portions (51), which are adapted to slide in the guide-ways (20¹) formed on the vertical plate (3), and abutment blocks (52) are formed at the inner ends of the said guide-ways to limit the forward movement of the breech blocks. A pin (53) passes through or studs are formed eccentrically on the sides of the front end of the rocking levers (23) and pivotally connected to the projecting ends of said pin or studs are the rear ends of coupling plates (54), which lie on both sides of the links (22) connecting the said levers to the breech blocks. The fore ends of the side plates (54) are slotted at (55) to engage studs (56) projecting laterally from the sides of the striking hammers. An opening (57) is cut from the lower parts of the slots (55) to permit of the plates (54) being disengaged from the studs (56) when it is desired to remove the hammers or springs actuating the same. The coupling plates (54) are formed with upwardly projecting lugs (58), through which screws or pins (59) can be passed to keep them at correct distances apart.

Sears (60) project downwardly from bell-crank levers (61), and are adapted to engage with detents (62) formed in the top of the striking hammers. The said levers (61) are pivoted at one end to pins (63) passing through the forward parts of the links (22), while their opposite ends are bent inwardly and furnished with screws (64) or other adjustable devices adapted to bear upon a releasing device. The sears (60), normally, are kept bearing upon the hammers or striking pins (42) by means of springs (65) of approved form, and the releasing device comprises levers (66) pivotally mounted on the top of the vertical plate (3). The levers (66) are disposed one on each side of the plate (3), and their lower ends are bent outwardly to lie in the paths of the screws (64) when the upper ends of said levers are pulled backwardly. One of the said levers (66) projects upwardly through the top of covers (67) fitted detachably over the breech mechanism, while the second lever (66) is shortened and formed on its upper end with two detents (68) designed to receive the end of a spring (69) fitted to a pin (70) on the plate (3). The detents (68) and spring (69) are adapted to hold the levers (66) in their operative and inoperative position, and to insure both levers operating uniformly they are both fitted rigidly to a pin (71) passing through the plate (3).

When the operating handle (33) is turned the rotary movement imparted to the toothed pinions (28) causes the pins (26) fitted eccentrically on the arms (27) to impart motion to the rocking levers (23), which in turn cause the breech blocks (20) to reciprocate on the rods (21) and in the guide-ways (20¹). The rocking levers (23) and the links (22) connected to the rear of the breech blocks (20) are horizontal or slightly below the horizontal at their pivot points when the breech blocks are in their extreme forward positions, and the rear ends of the said links rest upon stout abutment blocks (72) formed on or fitted to the sides of the vertical plate (3). When the breech blocks (20) are moving rearwardly, the connected ends of the levers (23) and links (22) move upwardly in the form of toggles, and the movements of the side plates (54) compress the springs (43) of the hammers or striking pins (42) and places the detents (62) formed therein in position to be engaged by the sears (60). The toggle-like movement of the rocking levers and links effects an easy and powerful initial extraction and also forces the cartridges firmly into the chambers of the barrels.

A small arm (73) depends from each of the links (22), and these arms are adapted to strike against the sides of projections (74) on (or recesses in) the rear ends of and to partially rotate the bolts (35) when the links are moving downwardly to their horizontal positions. The partial rotation of the said bolts (35) causes the outer sectional gripping members (36) to engage the rims of cartridges (12) (see Fig. 3) in the magazines (9), and the inner gripping members to hold the rims of cartridges fed to the barrels. As the links are moving to their horizontal positions the screws (64) come into contact with the inwardly turned portions on the lower ends of the levers (66) and the further downward movement of the links causes the hammers to be moved away from the sears (60) directly the breech blocks (20) are in their locked positions.

The hammers or firing pins can be released a little early or a little late by adjusting the positions of the screws (64), and should it be required to operate the gun without actuating the hammers the upper ends of the levers (66) can be pressed forwardly to move the lower ends thereof out of the path of the screws (64) fitted to the levers (61), so that the sears 60 will not be tripped.

The bolts (35) and consequently the segmental shaped cartridge gripping members are retained in position and prevented from moving accidentally by springs ($74^1$) fitted to the top of the bosses (34) and having downwardly bent portions shaped to fit into recesses (75) formed in collars (76) on the rear parts of the bolts. The rear parts of the bolts (35) can be screwed into or they can be otherwise affixed to the front parts.

An arm (77) is formed on each of the links (25) connecting the eccentric pins (26) to the rear ends of the rocking levers (23) and the upper ends of these arms are adapted to come into contact with the sides of the segmental shaped gripping members and rotate the same until projections ($36^1$) on the sides thereof abut against rods ($21^1$) lying parallel with and above the rods (21). The arms (77) are actuated to rotate the cartridge gripping members (36) when the breech blocks are at the rearward ends of their travel—see Figs. 5 and 6 of the drawings. The partial rotation thus effected causes the cartridges drawn from the magazines to be placed in line with the chambers (78) of the barrels (2) and the exploded shells to be placed in line with ejector tubes (79) through which they are expelled.

The forward movements of the breech blocks cause the cartridges to be fed into the barrels and the empty shells to be delivered to the ejector tubes. The partial rotation of the gripping members at the extreme forward ends of their travel causes the inside members to move around the rims of the cartridges held thereby while the outer members move away from the shells and engage the rims of fresh cartridges held in the magazine.

Safety devices are provided to prevent the breech blocks being released should a cartridge hang or miss fire, and these safety devices are automatically released by the recoil each time a cartridge is exploded in the barrel. The safety device comprises small levers (80) pivotally affixed to the sides of the plate (3) and having their lower ends forming engagements with rods (81) slidably fitted to the body, and loosely connected at their front ends to rods (82) fitted rigidly to the rear end of the water-jacket surrounding the barrels. The body (1) is free to slide over the said rods (82), and the latter are formed with slots (83) to receive screws (84) or the like fitted to the inner ends of the rods (81). The body of the gun is connected to a rod ($84^1$), which passes through the rear end of the water-jacket (4), and is connected by a strong spiral tension spring (85) to a rod (86) passing transversely through a forward part of the said water-jacket. As each cartridge is exploded the body (1) and barrels (2) are thrust backwardly a short distance by the force of the recoil, the movement automatically releasing the safety devices and permitting the continued operation of the mechanism.

When the empty shells are thrust into the ejector tubes (79) they are held therein by spring pressure until they are forced out by the next shell delivered thereto. The pressure required to hold the shells in the tubes (79) is obtained by placing a flat spring ($79^1$) beneath the body in such a position that raised portions or blocks ($79^2$) on the ends of the springs bear on the underside of the shells. The bottoms of the tubes (79) are mortised to accommodate the said blocks ($79^2$), and the pressure on the shells is sufficient to prevent them being moved by the vibration of the gun when the same is in operation.

A block (87) is formed on top of each of the rocking levers (23) in such a position that it abuts against or passes slightly beneath the rear and lower ends of the safety levers (80), when the latter are in their locking positions, and when the said safety levers are in this position the rocking levers cannot be operated until a cartridge is exploded.

To release the rocking levers by hand the upper ends of the safety levers (80) are pulled backwardly in opposition to the pressure of springs (88) until their lower ends are moved away from the blocks (87) on the rocking levers and the said safety levers can be retained in this position by springs (89) formed on or fitted to the rear ends of the rods (81), which normally press against the under faces of the blocks 87, but which can snap up in to the position shown in dotted lines in Fig. 18, when parts 81 and 87 will be held apart. The safety levers (80) are returned to their normal positions by means of the springs (88), and the rods (81) having a loose engagement with the lower ends thereof can be moved sufficiently without affecting the spring (85) which is employed to return the body and barrels to their normal positions after each explosion of the cartridges. The operating mechanisms are the same on both sides of the body, and the movements of the different parts and the functions they perform are identical.

The improved gun can be provided with any approved form of mounting that will suit the particular position or place in which it is to be used. A simple and efficient mounting is shown in the drawings, and consists in detachably affixing the rear end and underside of the water-jacket (4) to a horizontal arm (89¹) of a bell-crank (90) mounted pivotally on a revoluble standard (91) fitted to a base (92) supported on tripod legs (93) or the like. If preferred, a friction bearing can be provided to prevent the standard (91) moving unless a considerable force is employed. Moreover, a worm and pinion device or the like can be used to rotate the standard on the base.

The underside of the water-jacket (4) is provided at its rear end with a jaw (94), which fits over the rear end of the bell-crank (90), and is securely affixed thereto by a detachable pin or bolt (95). Fitted to the underside of said water-jacket and in advance of the jaw (94) is a hook (96), which is adapted to be inserted between two pins (97) at the fore end of the bell-crank (90). The bell-crank is pivotally mounted on a pin (98), which passes through the standard (91), and its lower end pivotally supports a block (99), which engages a screw (100) affixed revolubly to lugs (101) on the lower end of the standard. The screw (100) is prevented from moving endwise by nuts (102) on the end thereof, and a hand wheel (103) or other approved means can be provided to operate the said screw. When the hand wheel is operated the screw causes the bell-crank, and consequently the gun, to be moved more or less from the horizontal, thereby permitting a desired elevation or depression to be obtained easily. The standard (91) can be retained fixedly in position on the base (92) by tightening up a screw (104), but when in use the said screw is slackened to permit of the gun barrels being moved in any direction required.

Any suitable form of sighting appliances (not illustrated) can be affixed to the gun to insure accuracy of aim.

In order to permit of either of the mechanisms being operated independently of the other, the wheels (30) are provided with spring actuated pawls (105), which are adapted to be engaged by a recess (106) formed approximately in the center of the spindle (32¹). When the spindle (32¹) is in its normal position, the pawls (105) in both wheels (30) are in engagement with the recess (106) in the spindle, and the rotation of the handle (33) will cause both mechanisms to be operated continuously and in opposite directions. The ends of the recess (106) and the edges of the pawls (105) preferably are tapered, and by pulling the spindle (32¹) outwardly or pushing it inwardly until only one pawl (105) is engaged by the said slot, then the mechanism on that particular side of the gun only will be operated. The spindle (32¹) can be passed through the body from both sides, and should one of the operating mechanisms become damaged or get out of order, repairs can be effected thereto while the other mechanism is being operated. Should one of the mechanisms misfire, jam or become inoperative from any cause, it can be readily ascertained by noting an indicating contrivance on the outside of the cover on the right hand side of the body. The said indicating contrivance consists of an arrow (107) cut into or pointer formed on the cover radially with the operating spindle (32¹), and a marked collar (108) on an adjacent part of the said spindle. In the gun shown in the drawings four indicating marks (109) are made on the said collar corresponding to the number of shots fired at each revolution of the spindle. As each shot is fired, the marks (109) on the collar are brought successively opposite the pointer or arrow (107), and as the cartridges are discharged alternately through both barrels, the said marks serve to indicate on which side the mechanism has failed to act. This indicating contrivance is exceedingly convenient in enabling the operator to readily determine the particular mechanism that is out of action, so that he is enabled to remove the right cover to get at it to remedy the fault without loss of time.

The studs (24) upon which the rocking levers (23) are mounted can be made adjustable so as to permit of them being moved forwardly to compensate for wear of the pivot parts of said levers and of the links (22). The adjustment of the said studs may be necessary to insure the cartridges being thrust firmly and correctly into the chambers of the barrels. In order to permit of the adjustment of the studs (24) being effected they can be formed with lugs (110) on their inner ends, and arranged to project upwardly and downwardly therefrom. The top lugs are pivotally mounted on a pin (111), while the bottom lugs are slotted to accommodate screw pins (112), which can be operated by a box spanner or the like through holes in the covers (67). Thrust screws (113) are mounted in blocks or lugs (114) formed on the plate (3) at the rear of the studs (24), and by operating said screws the studs can be forced forwardly a required amount to compensate for the wear of the parts. When the studs have been moved to their required positions, the screws (112) are tightened to retain them in their set positions. The thrust screws (113), like the tightening screws (112), can be operated through holes in the covers and by the same spanner or tool. When the water or other cooling medium in the water-jacket (4) becomes heated with rapid firing through the gun barrels, the steam resulting therefrom can escape through tubes (115), extending along the top and inside of said jacket to an outlet tube (116). The tubes (115) have their outer ends opening into the ends of the water-jacket (4) and their inner ends preferably are flattened and enter a circular valve seat (117), having closed ends and mounted on a conical sheet metal support (118). The said support is connected to the valve seat (117), and to the water-jacket (4) in such a way that the water in the last-mentioned cannot escape. The bottom of the water-jacket at the base of the support is cut away to permit of access being had to the weighted end of the outlet tube (116), depending from a three-way cock or valve (119) accommodated by the seat. The valve has a free movement in the seat, and the weighted tube acts as a pendulum to automatically cut off the lowermost tube (115) when the barrels are elevated or depressed while leaving the uppermost tube in communication with the depending tube to permit of the escape of steam or vapor from the highermost end of the water-jacket. The lower end of the said tube (116) is normally closed by a stopper (120) or the like, but when the gun is to be used for rapid firing this plug is removed to permit of the escape of steam as before described. To insure the valve (119) operating perfectly that portion of it which lies above the horizontal passage is cut away, as shown in the drawings. The front ends of the rods (21¹) are formed with recesses (121) on their underside to provide room for the passage of the projections (36¹), when the gripping members are partially rotated by the downward movement of the link (22).

What I do claim is:—

1. A quick-firing machine gun, comprising a stout body having a barrel fitted to the front thereof, a breech-block slidably mounted in guides on said body, a link connecting said block to a rocking lever, a link connection between said rocking lever and an eccentric operated by a revoluble spindle and toothed gearing, a bolt revolubly mounted on the side of said breech-block, two segmental shaped cartridge-gripping members on the front of said bolt, firing pins fitted to springs on the rear of said members, a striking hammer having a recess in the top thereof, and an operating spring in the link connecting said breech-block to said rocking lever, a spring actuated bell-crank having a sear depending therefrom and adapted to engage said recess, and a member on said bell-crank adapted to contact with an abutment piece on the said body to release the sear when the said breech-block is closed.

2. A quick-firing machine gun, comprising a stout body having a barrel fitted to the front thereof, a sliding breech-block connected by a link to the forward end of a rocking lever, a link connecting the rear end of said lever to an eccentric, a bolt revolubly mounted on said breech-block, oppositely disposed segmental shaped gripping members on said bolt, an abutment member on the first-mentioned link, adapted to contact with projections on said bolt, and partially rotate the same when in its forward position, an arm on the second-mentioned link adapted to abut against and partially rotate the segmental gripping members when the same are at the rear of their travel, and a spring normally holding the said bolt in position.

3. In a quick-firing machine gun, a sliding breech-block having a link connection with a rocking lever, a striking hammer passing through and reciprocatingly mounted in said link and in said breech-block, a spring acting on said hammer, links pivotally mounted on studs projecting from said rocking lever in advance of the pivot connection with the link, and slots in said links engaging studs on said hammer.

4. In a quick-firing machine gun, a sliding breech-block having a link connection with a rocking lever, a striking hammer reciprocatingly mounted in said link and breech-block and having a recess in the top thereof, a spring acting on said hammer, a lever pivoted to said link, and having a depending sear for engaging said recess, a spring acting on said pivoted lever, a screw on said lever, and an abutment member in the path of said screw.

5. In a quick-firing machine gun, the combination of a body having a barrel fitted thereto, and a breech-block reciprocatingly mounted on said body, a link connecting said breech-block to the forward end of a rocking lever, a link connecting the rear end of said lever to an eccentric revolubly mounted on the body, a projection on said lever in advance of the pivot point thereof, a second lever pivoted to the body and adapted to bear on said projection when the breech-block is closed, a connection between said second lever and the rear end of a rod, the front end of which is loosely connected to the gun mounting, a spring fitted to and projecting rearwardly from said rod, and a spring for exerting a rearward pressure on the lower end of the lever.

6. In a quick-firing machine gun, a body fitted with a sliding breech-block, a link connecting said breech-block to a rocking lever mounted on an adjustable stud, said stud having an upwardly and a downwardly projecting arm at its base, a pivot pin passing through said upper arm, a slot in the lower arm, a tightening screw passing through said slot, a block or nut on the body, and an adjustment screw in said block or nut.

7. In a quick-firing machine gun; a rocking lever, a sliding breech-block, an eccentric mounted on a pinion, link connections from said rocking lever to said breech-block and to said eccentric, a toothed wheel engaging said pinion, a spring actuated pawl in and a spindle passing through said wheel, a recess in said spindle engaging said pawl, and an operating handle on said spindle.

8. In a quick-firing machine gun, a body having a barrel fitted thereto, a water-jacket surrounding said barrel, a boss on the side of said water-jacket, a spindle in said boss, a spring acting on said spindle, an arm hingedly connected to the outer end of said spindle, and a retaining block on the outer end of said boss.

9. A quick firing machine gun, comprising a stout body having a barrel fitted to the front thereof, a sliding breech-block connected by a link to the forward end of a rocking lever, a link connecting the rear end of said lever to an eccentric, a bolt revolubly mounted on said breech-block, oppositely disposed segmental shaped gripping members on said bolt, an abutment member on the first mentioned link adapted to contact with projections on said bolt, and partially rotate the same when in its forward position, an arm on the second mentioned link adapted to abut against and partially rotate the segmental gripping members when the same are at the rear of their travel, a spring normally holding the said bolt in position, a circular cartridge magazine mounted revolubly in front of the gun body, and a jaw on the side of said body adapted to receive the butt ends of cartridges projecting radially from said magazine.

10. In a quick-firing machine gun, a body resiliently connected to its mounting and adapted to recoil on the discharge of a cartridge, a safety catch released by said recoil, and comprising a lever pivoted to the body, and having its lower end engaging a rod loosely connected to the gun mounting, a spring exerting a rearward pressure on the lower end of said lever, an operatable extension on said lever, a block or projection on the breech mechanisms engaged by the lever until the discharge of a cartridge, and a spring on said rod for retaining the safety catch in its inoperative position when a cartridge has been so discharged.

11. In a quick firing machine gun, a slidably mounted breech-block, cartridge gripping members fitted to said breech-block and arranged to oscillate about an axis parallel to the movement of the block proper, said members having their edges cut away to form actuating surfaces, link mechanism for reciprocating said block, and an arm carried by said mechanism and adapted to contact with said surfaces for oscillating said members.

In testimony whereof I affix my signature in presence of two witnesses.

THOMAS FREDERICK CALDWELL.

Witnesses:
G. McNamara,
W. A. Ashton.